United States Patent Office 3,443,197
Patented May 6, 1969

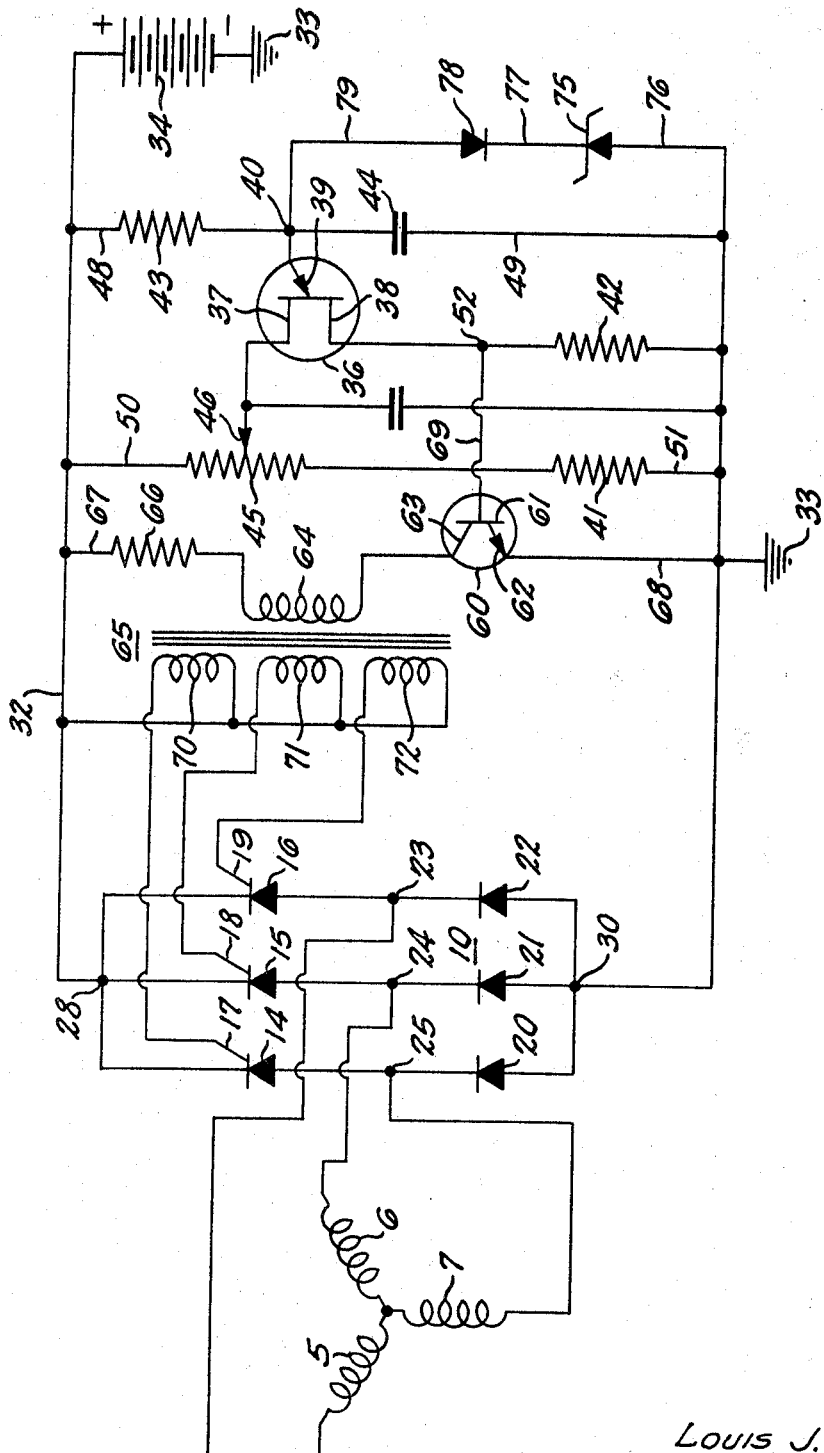

3,443,197
POTENTIAL REGULATOR CIRCUIT FOR PERMANENT MAGNET TYPE ALTERNATORS
Louis J. Raver and Maurice V. Shaw, Anderson, Ind., assignors to General Motors Corporation, Detroit, Mich., a corporation of Delaware
Filed Aug. 13, 1965, Ser. No. 479,478
Int. Cl. H02m 1/08, 7/00
U.S. Cl. 321—18                        4 Claims

ABSTRACT OF THE DISCLOSURE

A potential regulator circuit for regulating the output potential of a rectified alternating current electrical generating system wherein the primary winding of a pulse transformer in series with the collector-emitter electrodes of a transistor and a unijunction transistor type relaxation oscillator, biased in such a manner that it oscillates only when the rectifier output potential is of a magnitude less than a predetermined maximum, are connected in parallel across the direct current output circuitry of the system rectifier which contains at least one silicon controlled rectifier. A secondary winding of the pulse transformer is connected across the gate-cathode electrode of each silicon controlled rectifier contained therein. Each output pulse of the relaxation oscillator is applied to the base electrode of the transistor to trigger this device conductive to complete an energizing circuit for the primary winding of the pulse transformer whereby the resulting series of pulses are transformer coupled to each silicon controlled rectifier device in the rectifier circuit.

---

The present invention relates to a potential regulator circuit, and more specifically, to a potential regulator circuit for use with permanent magnet type alternators.

With dynamoelectric machines which depend upon current flowing through a field coil or winding for producing the necessary magnetic field, it is a common expedient to alter the amount of current flowing through the field coil in response to changes of output potential magnitudes for purposes of regulating the output potential of the machine. Permanent magnet type alternators, however, present a different regulating problem in that permanent magnet units provide the necessary magnetic field and, therefore, machines of this type are not adaptable to potential regulator circuits or arrangements which alter field coil current.

As alternators of the permanent magnet type offer certain advantages from the standpoint of cost and reliability over the field coil type, the requirement for a reliable and inexpensive potential regulator circuit or arrangement for dynamoelectric machines of the permanent magnet type is apparent.

It is, therefore, an object of this invention to provide an improved potential regulator circuit for use with permanent magnet type alternators.

It is another object of this invention to provide an improved potential regulator circuit for use with permanent magnet type alternators wherein one or more of the unidirectional current translating devices employed in the rectifier circuit is of the type which may be triggered to conduction upon the application to the control electrode thereof of a control potential signal of proper polarity.

In accordance with this invention, a potential regulator circuit for use with permanent magnet type alternators is provided wherein a potential sensitive arrangement is connected across the regulated potential terminals for producing a control potential signal which may be applied to the control electrode of one or more unidirectional current translating devices, included in the rectifier circuitry, of the type which may be triggered to conduction upon the application of a control potential signal of proper polarity to the control electrode thereof when the rectified output potential is less than a predetermined maximum.

For a better understanding of the present invention, together with additional objects, advantages and features thereof, reference is made to the following description and single figure drawing which schematically sets forth an embodiment of the regulator circuit of this invention.

For purposes of illustrating the features of the novel regulating arrangement of this invention and without intention or inference of a limitation thereto, the operation will be described in reference to a three phase permanent magnet type alternator. The stator coils of a three phase permanent magnet type alternator are schematically illustrated in the figure as Y-connected coils 5, 6 and 7. These coils may, of course, also be connected in a delta configuration. A magnetic field produced by a permanent magnet or magnets, not shown, moves relative to these coils and generates a three phase potential therein in a manner well known in the art. The regulating circuit arrangement of this invention regulates the rectified output potential of alternators of this type in a manner now to be explained.

To convert the three phase alternating current output potential generated in coils 5, 6 and 7 to a rectified direct current output potential, a rectifier cricuit, generally shown at 10, is provided. In the figure, rectifier circuit 10 is illustrated as a three phase bridge type circuit having three controllable unidirectional current translating devices, each having two current carrying electrodes and a control electrode and being of the type which may be triggered to conduction upon the application of a control potential signal of proper polarity to the control electrode thereof, in the positive polarity bank and three conventional unidirectional current translating devices in the negative polarity bank. Without intention or inference of a limitation thereto, the controllable unidirectional current translating devices have been herein shown as silicon controlled rectifiers 14, 15 and 16 having respective control electrodes 17, 18 and 19 and the conventional unidirectional current translating devices have been illustrated as conventional diodes 20, 21 and 22. The free ends of stator coils 5, 6 and 7 are connected to respective junctions 23, 24 and 25 of rectifier circuit 10.

The silicon controlled rectifier is a semiconductor device having a control electrode, generally termed the gate electrode, and two current carrying electrodes, generally referred to as the anode and cathode electrodes, which is designed to normally block current flow in either direction. With the anode and cathode electrodes forward poled, anode positive and cathode negative, the silicon controlled rectifier may be triggered to conduction upon the application to the control electrode of a control potential signal of a polarity which is positive in respect to the potential present upon the cathode electrode and of a sufficient magnitude to produce control electrode-cathode current. In the conducting state, the silicon controlled rectifier will conduct current in one direction and retains the ability to block current flow in the opposite direction. In the conducting state, therefore, the silicon controlled rectifier functions as a conventional diode.

The rectifier output potential appears across positive polarity junction 28 and negative polarity junction 30 which may be terminals. With this configuration, line 32 is the positive polarity line. The negative polarity junction 30 may be connected to point of reference or ground potential 33 which, since it is the same point electrically, has been referenced by the same numeral throughout the drawing. The rectified output potential may be employed to charge a conventional storage battery 34 connected across positive polarity potential line 32 and point of reference potential 33 and poled as shown.

To produce the control potential signal which may be applied to the respective control electrodes 17, 18 and 19 of silicon controlled rectifier devices 14, 15 and 16, a potential sensitive circuit is provided. This potential sensitive circuit is shown in the drawing to be a conventional unijunction transistor relaxation oscillator which includes unijunction transistor 36, resistors 41, 42 and 43, capacitor 44 and variable resistor 45 having a movable contact 46.

Unijunction transistor 36 has two base electrodes 37 and 38 and an emitter electrode 39. The emitter electrode 39 is connected to the junction 40 between resistor 43 and capacitor 44 which are connected in series across positive polarity potential line 32 and point of reference or ground potential 33 through respective lines 48 and 49. Also connected in series across positive polarity potential line 32 and point of reference or ground potential 33 are the end terminals of variable resistor 45 and resistor 41, through respective lines 50 and 51, and that portion of variable resistor 45, as determined by the setting of movable contact 46, the base electrodes 37 and 38 of unijunction transistor 36 and resistor 42.

The control signal potential appears at junction 52 when unijunction transistor 36 is conducting, in a manner to be later explained.

To amplify the control signal potential, a type NPN transistor 60 having the usual base 61, emitter 62 and collector 63 electrodes may be employed. The collector electrode 63 of transistor 60 is connected to positive polarity potential line 32 through primary winding 64 of a conventional pulse transformer 65, resistor 66 and lead 67 while the emitter electrode 62 thereof is connected to point of reference or ground potential 33 through lead 68. With the emitter and collector electrodes of transistor 60 connected as shown, this type NPN transistor is forward poled. The base electrode 61 thereof is connected to junction 52 through lead 69.

The amplified control potential signal which may be taken off the collector electrode 63 of transistor 60 may be applied to these control electrodes through a conventional pulse transformer 65 through respective secondary coil windings 70, 71 and 72 as shown. One advantage of employing a pulse transformer is that direct current isolation between the potential sensitive trigger circuitry and the silicon controlled rectifier devices to be triggered is provided.

Between the bases, a unijunction transistor has the characteristics of an ordinary resistance. The normal biasing conditions for a unijunction transistor device are as shown in regard to unijunction transistor 36 of the drawing. As the emitter potential is of a magnitude less than the emitter peak point potential, the emitter will be reverse biased and only a small reverse leakage current will flow. The peak point potential of a unijunction transistor device varies in proportion to the product of the interbase potential multiplied by the intrinsic standoff ratio plus the equivalent emitter diode voltage. If resistor 45 is correctly selected, the peak voltage of the unijunction transistor device will vary in proportion to the product of the interbase potential multiplied by the intrinsic standoff ratio. The intrinsic standoff ratio of unijunction transistor devices usually is within the range of .51 to .75.

The maximum rectified output potential, as determined by the external electrical circuitry or components with which the potential generating system is to be employed, is selected. When the rectified output potential appearing across positive polarity potential line 32 and point of reference potential 33 is greater than this predetermined maximum, unijunction transistor device 36 should be nonconductive so that a control potential signal is not produced to trigger silicon controlled rectifier devices 14, 15 and 16 to conduction, a condition which interrupts the charging current, thereby reducing the magnitude of the rectified output potential. With the magnitude of rectified output potential appearing across positive potential polarity line 32 and point of reference potential 33 substantially equal to this predetermined maximum, unijunction transistor 36 should be conducting to produce the control signal potential which, when applied to the respective control electrodes 17, 18 and 19 of silicon controlled rectifiers 14, 15 and 16 will trigger these devices to conduction, a condition which tends to increase the normal rectified output potential magnitude.

The interbase potential across the base electrodes 37 and 38 of unijunction transistor 36 in a nonconducting state is substantially equal to the rectified output potential magnitude. Unijunction transistor 36 should not conduct when the rectified output potential is of a magnitude greater than the potential appearing at junction 40 divided by the intrinsic standoff ratio of unijunction transistor 36. When the rectified output potential magnitude is less than the potential at junction 40 divided by the intrinsic standoff ratio of unijunction transistor 36, this device should conduct to produce the required control potential signals to trigger silicon controlled rectifer devices 14, 15 and 16 to conduction.

Zener diode 75 is connected between point of reference or ground potential 33 and junction 40 through respective leads 76 and 77, conventional diode 78 and lead 79. Zener diode 75 is connected in this manner to clamp the emitter electrode 39 of unijunction transistor 36 at a substantially constant potential which will not significantly change with variations of the rectified output potential. Therefore Zener diode 75 should be selected to have a rated inverse potential breakdown of a value substantially equal to the magnitude of the predetermined maximum rectified output potential multiplied by the intrinsic standoff ratio of the unijunction transistor selected. Diode 78 is included in this circuit to provide temperature compensation. Resistor 45 may be variable to properly select the value of this resistance to correctly compensate for variations in Zener diodes, unijunction transistors and other circuit components.

Assuming that the magnitude of the rectified output potential appearing across positive polarity potential line 32 and point of ground or reference potential 33 remains substantially equal to the selected predetermined maximum, unijunction transistor 36 will remain nonconductive until the charge upon capacitor 44 through resistor 43 has reached a magnitude as determined by the rated inverse breakdown potential of Zener diode 75. When this potential has reached this magnitude, unijunction transistor 36 will suddenly conduct and capacitor 44 will discharge through the emitter-base circuit of unijunction transistor 36 and resistor 42. This flow of discharge current produces a control potential signal across resistor 42 which is of a positive polarity at junction 52. This signal is amplified by transistor 60 and is applied to the control electrodes 17, 18 and 19 of silicon controlled rectifier devices 14, 15 and 16 through pulse transformer 65.

When capacitor 44 has discharged and the emitter peak point potential appearing at junction 40 has reduced in magnitude to a value of about two volts, the emitter ceases to conduct and the unijunction transistor device becomes nonconductive.

Assuming that the rectified output potential has not increased above the predetermined maximum, capacitor 44 will again receive a charge through resistor 43 which, when attaining a magnitude substantially equal to the breakdown potential of Zener diode 75, will bias unijunction transistor device 36 to conduction which permits capacitor 44 to again discharge through the base-emitter circuit of unijunction transistor 36 and resistor 42 again producing the control potential signal thereacross which is of a positive polarity at junction 52. So long as the rectified output potential remains substantially constant, this cycle repeats at a frequency as determined by the parameters of the circuit elements selected.

When the rectified output potential increases to a magnitude greater than the predetermined maximum, the interbase potential across unijunction transistor 36 is greater than the emitter peak point potential, consequently, unijunction transistor device 36 is not triggered to conduction and the control potential signal, of course, does not appear at junction 52. In the absence of this control potential signal, silicon controlled rectifier devices 14, 15 and 16 are not triggered to conduction and curent flow is blocked between stator windings 5, 6 and 7 and positive polarity potential line 32, a condition which tends to reduce the magnitude of the rectified output potential appearing thereacross.

When the magnitude of the rectified output potential appearing across positive polarity potential line 32 and point of reference potential 33 reduces to a magnitude substantially equal to or less than the predetermined maximum, the relaxation oscillator again operates to produce the control signal potential which triggers silicon controlled diodes 14, 15 and 16 of the bridge rectifier circuit to conduction.

As alternating current potentials are produced in coils 5, 6 and 7, silicon controlled rectifier devices 14, 15 and 16 are extinguished by the reverse bias potential applied thereacross with each negative excursion of the alternating current cycles.

This invention has been described in reference to the full wave rectification of a three phase alternating current generated potential. It is to be understood that this arrangement is equally applicable to full or half wave rectification of more or less alternating current phases and is not to be construed as limited to the specific embodiment of the figure. With half wave rectification, of course, fewer unidirectional current translating devices are required in the rectifier circuitry and with more or less phases, more or less unidirectional curent translating devices may be required. In fact, the regulating arrangement of this invention may be employed in a half wave rectifier circuit employing only a single controllable unidirectional current translating device similar in characteristics to that of the silicon controlled rectifiers herein illustrated.

While a prefered embodiment of the present invention has been shown and described, it will be obvious to those skilled in the art that various modifications and substitutions may be made without departing from the spirit of the invention which is to be limited only within the scope of the appended claims.

What is claimed is as follows:

1. A potential regulating circuit for regulating the rectified output potential of a permanent magnet type alternator comprising a rectifier circuit including at least one controllable unidirectional current translating device having an anode, a cathode and a control electrode and being of the type which may be triggered to conduction upon the application of a control potential signal of proper polarity to the control electrode thereof for rectifying the output potential of said alternator, output circuit means across which said rectified output potential appears, a unijunction transistor device having two base electrodes and an emitter electrode, first, second and third resistors, a variable resistor having a movable contact, a capacitor, means for connecting said first resistor and said capacitor in series across said output circuit means, means for connecting said second resistor and said variable resistor in series across said output circuit means, means for connecting that portion of said variable resistor as determined by the setting of said movable contact thereof, said base electrodes of said unijunction transistor device and said third resistor in series across said output circuit means, means for connecting said emitter electrode of said unijunction transistor device to the junction of said first resistor and said capacitor and means for applying the control potential signal which appears at the junction of one of said base electrodes of said unijunction transistor device and said third resistor when the magnitude of said rectified output potential is less than a predetermined maximum to the said control electrode of said controllable unidirectional current translating device.

2. A potential regulating circuit for regulating the rectified output potential of a permanent magnet type alternator comprising a rectifier circuit including at least one unidirectional current translating device and at least one controllable unidirectional current translating device having an anode, a cathode and a control electrode and being of the type which may be triggered to conduction upon the application of a control potential signal of proper polarity to the control electrode thereof for rectifying the output potential of said alternator, output circuit means across which said rectified output potential appears, a unijunction transistor device having two base electrodes and an emitter electrode, first, second and third resistors, a variable resistor having a movable contact, a capacitor, means for connecting said first resistor and said capacitor in series across said output circuit means, means for connecting said second resistor and said variable resistor in series across said output circuit means, means for connecting that portion of said variable resistor as determined by the setting of said movable contact thereof, said base electrodes of said unijunction transistor device and said third resistor in series across said output circuit means, means for connecting said emitter electrode of said unijunction transistor device to the junction of said first resistor and said capaictor and means for applying the control potential signal which appears at the junction of one of said base electrodes of said unijunction transistor device and said third resistor when the magnitude of said rectified output potential is less than a predetermined maximum to the said control electrode of said controllable unidirectional current translating device.

3. A potential regulating circuit for regulating the rectified output potential of a permanent magnet type alternator comprising a full wave three phase bridge type rectifier circuit including at least three unidirectional current translating devices and three controllable unidirectional current translating devices each having an anode, a cathode and a control electrode and being of the type which may be triggered to conduction upon the application of a control potential signal of proper polarity to the control electrode thereof for rectifying the output potential of said alternator, output circuit means across which said rectified output potential appears, a unijunction transistor device having two base electrodes and an emitter electrode, first, second and third resistors, a variable resistor having a movable contact, a capacitor, means for connecting said first resistor and said capacitor in series across said output circuit means, means for connecting said second resistor and said variable resistor in series across said output circuit means, means for connecting that portion of said variable resistor as determined by the setting of said movable contact thereof, said base electrodes of said unijunction transistor device and said third resistor in series across said output circuit means, means for connecting said emitter electrode of said unijunction transistor device to the junction of said first resistor and said capacitor and means for applying the control potential signal which appears at the junction of one of said base electrodes of said unijunction transistor device and said third resistor when the magnitude of said rectified output potential is less than a predetermined maximum to the said control electrode of each of said controllable unidirectional current translating devices.

4. A potential regulating circuit for regulating the rectified output potential of a permanent magnet type alternator comprising a full wave three phase, bridge type rectifier circuit including at least three unidirectional current translating devices and three controllable unidirectional current translating devices each having an anode, a cathode and a control electrode and being of the type which may be triggered to conduction upon the application of a control potential signal of proper polarity to the control electrode thereof for rectifying the output potential of said alternator, output circuit means having positive and negative terminal means across which said rectified output potential appears, a unijunction transistor device having two base electrodes and an emitter electrode, first, second and third resistors, a variable resistor having a movable contact, a capacitor, means for connecting said first resistor and said capacitor in series across said output circuit means, means for connecting said second resistor and said variable resistor in series across said output circuit means, means for connecting that portion of said variable resistor as determined by the setting of said movable contact thereof, said base electrodes of said unijunction transistor device and said third resistor in series across said output circuit means, means for connecting said emitter electrode of said unijunction transistor device to the junction of said first resistor and said capacitor, a pulse transformer having a primary winding and three secondary windings, a transistor having base, emitter and collector electrodes, means for connecting said emitter and collector electrodes of said transistor device in series across said output circuit means, means for connecting said primary winding in series with said emitter and collector electrodes of said transistor, means for connecting said base electrode of said transistor to the junction of said one base electrode of said unijunction transistor device and said third resistor, and means for connecting each of said secondary windings to a respective one of said control electrodes of said controllable unidirectional current translating devices.

References Cited

UNITED STATES PATENTS

| | | | |
|---|---|---|---|
| 3,116,446 | 12/1963 | Healey | 321—18 |
| 3,205,426 | 9/1965 | Mills | 321—18 |
| 3,221,241 | 11/1965 | Greenberg et al. | 321—18 XR |
| 3,281,638 | 10/1966 | Crawford | 321—16 XR |
| 3,300,704 | 1/1967 | McMillen | 320—61 |
| 3,304,486 | 2/1967 | Michaels | 321—18 |
| 3,310,729 | 3/1967 | Burgess et al. | 321—18 |
| 3,315,141 | 4/1967 | Wright et al. | 320—59 |
| 3,343,059 | 9/1967 | Kirk et al. | 320—39 |
| 3,350,626 | 10/1967 | Mosier | 322—28 XR |
| 3,364,416 | 1/1968 | Kirk et al. | 322—28 XR |

JOHN F. COUCH, *Primary Examiner.*

W. M. SHOOP, JR., *Assistant Examiner.*

U.S. Cl. X.R.

320—40; 321—47; 322—28